Figure 1:
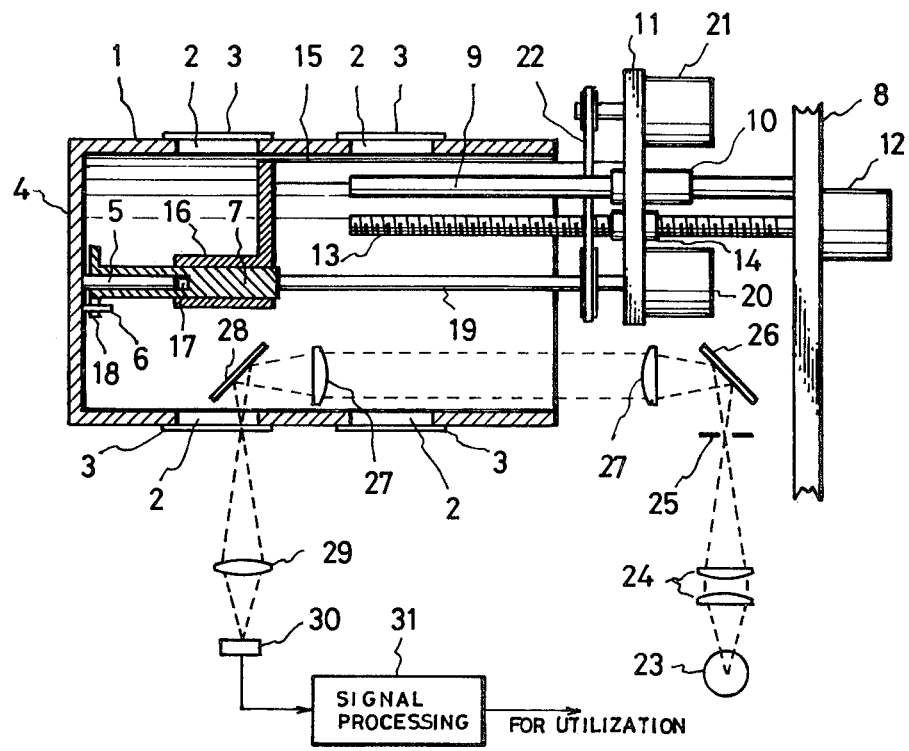

United States Patent [19]

Takahama

[11] 4,440,491
[45] Apr. 3, 1984

[54] PHOTOGRAPHIC TRANSPARENCY SUPPORTING DEVICE

[75] Inventor: Sho Takahama, Takarazuka, Japan

[73] Assignee: Konan Camera Research Institute, Hyogo, Japan

[21] Appl. No.: 305,186

[22] Filed: Sep. 24, 1981

[30] Foreign Application Priority Data

Oct. 2, 1980 [JP] Japan ................................ 55-138447

[51] Int. Cl.³ .............................................. G03B 27/62
[52] U.S. Cl. ..................................... 355/75; 355/110; 355/117; 358/291
[58] Field of Search ................................... 355/47–49, 355/104, 108, 109, 110, 117, 75, 76; 358/291; 354/15, 18, 19, 292

[56] References Cited

FOREIGN PATENT DOCUMENTS 52-64210 5/1977 Japan .................................. 358/291
55-44279 3/1980 Japan .................................. 358/291

Primary Examiner—Richard A. Wintercorn
Attorney, Agent, or Firm—Eugene E. Geoffrey, Jr.

[57] ABSTRACT

A device, which is especially useful in color scanning equipment and the like, for supporting a photograhic transparency on a scanning cylinder, in which the cylinder surface is provided with a window and a layer of magnetic rubber surrounding the window, and a trimming mask made of magnetic material held in position by the rubber magnet layer, thereby enabling the support of the photographic transparency to be scanned between the trimming mask and the magnet layer so that the transparency covers the window.

3 Claims, 2 Drawing Figures

PHOTOGRAPHIC TRANSPARENCY SUPPORTING DEVICE

This invention relates to photographic transparency supporting device which is especially suitable for use in a color scanning system for supporting a photographic transparency to be scanned on a scanning cylinder. This device is especially useful in the case of trimming the transparency.

The color scanner is a device used for preparation of color printing blocks from a color photographic transparency and is described, for example, in the article of Yoshio Ono, OVERVIEW OF COLOR SCANNERS, Jour. Jap. Soc. of Image Electronics, Vol. 9, No. 2 (1980) pp. 93–101. In the color scanner, a color photographic transparency is scanned with a visible light beam, so-called "flying spot" transmitted therethrough. As described, for example, in the book THIRTY FIVE YEARS OF IMAGE TECHNIQUE, Chap. 6 (Color Scanner), page 121, published by Dai-Nippon Screen Manufacturing Co. (Tokyo), the photographic transparency to be scanned has been attached to the surface of a scanning cylinder made of transparent plastics with adhesive tapes. However, in such a prior art technique, disadvantages have been encountered such that dust, stains and other contamination of the scanning cylinder might affect, undesirably, the result and it was inconvenient to provide a trimming mask to mask the transparency.

Accordingly, an object of this invention is to provide a novel and improved transparency supporting device which can facilitate the attachment of a photographic transparency onto the scanning cylinder and also to provide a trimming mask for the transparency, without the abovementioned disadvantages of the prior art.

According to a feature of this invention, a scanning cylinder is provided with at least a window in the wall and the portion of the cylinder surrounding the window has a layer of permanent magnet material while the trimming mask is formed of magnetic material which is attracted by the permanent magnet material.

These and other objects and features of this invention will be described in more detail hereinunder with reference to the accompanying drawings.

Figure 2:
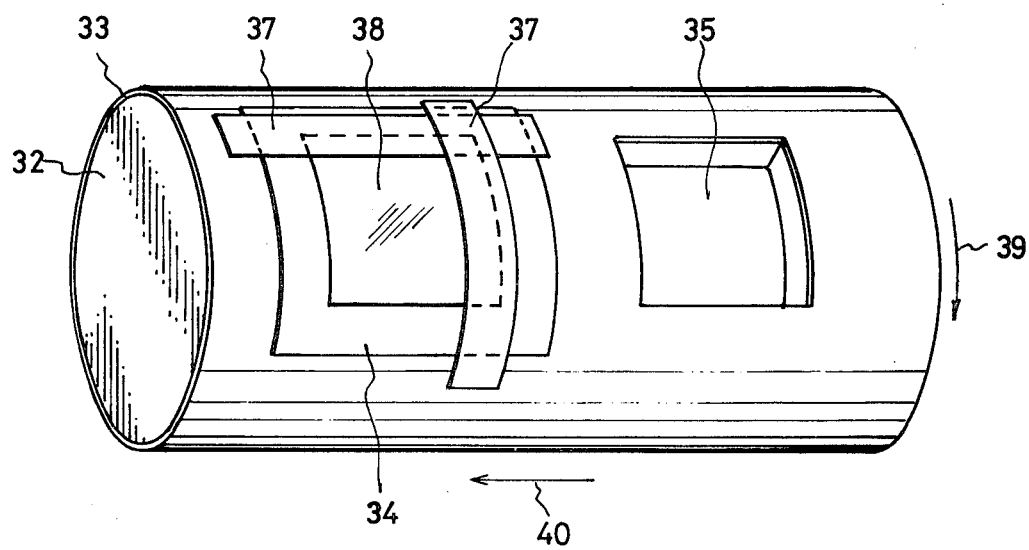

IN THE DRAWINGS:

FIG. 1 is a partly schematic sectional view representing a part of density correction system of a color scanner in which this invention is embodied; and FIG. 2 is a perspective view representing a scanning cylinder of the system of FIG. 1 including an embodiment of this invention.

Referring to FIG. 1, the system comprises a rotary scanning cylinder 1 having a plurality of windows 2 in the side wall, which are to be covered with photographic transparencies 3 attached in a manner as described later. The scanning cylinder 1 has an end wall 4 which closes one end thereof and has a support pin 5 extending inwardly along the axis of the cylinder 1 from the center of the end wall 4. The support pin 5 is slidably fitted in a central hole 17 of an axle member 7 having a flange 18 at one end thereof which is locked to the end wall 4 with a stop pin 6 extending inwardly from the end wall 4 and fitting in a slot formed in the flange 18.

A guide post 9 extends from a bracket 8 (only a part of which is shown) fixed to a base or bed of the device (not shown) and supports a platform 11 slidably through a guide sleeve 10 so that the platform 11 can move along the guide post 9. A step motor 12 is fixed to the bracket 8 and a screw shaft 13 extending from the step motor 12 is parallel to the guide post 9 and meshes with a screw sleeve 14 fixed to the platform 11. A support arm 15 extends also from the platform 11 into the scanning cylinder 1 and includes a bearing member 16 at the top which rotatably supports the abovementioned axle member 7.

A rotating shaft 19 extending along the axis of the cylinder 1 is fixed at one end to the other end of the axle member 7 and coupled at the other end to an angle-of-rotation encoder 20 for producing a code signal indicative of the circumferential position on the transparency which is scanned currently. A motor 21 is also attached to the platform 11 and the motor shaft is coupled rotationally to the shaft 19 through a belt-pulley assembly 22.

The system also includes scanning optics comprising a light source 23 and condenser lens 24 for focusing the light from the light source 23 at a pin hole 25. The light passing the pin hole 25 is reflected by a mirror 26 and led into the scanning cylinder 1 through focusing lens 27 which focuses the light reflected by another mirror 28 onto the photographic transparency 3 as a light spot. The light passing the transparency 3 is collected by a condenser lens 29 and focused onto a photoelectric sensing element 30 which converts the incident light into an electric signal which is in turn processed appropriately in signal processing circuitry 31 for utilization.

As shown in FIG. 2, as an embodiment, the scanning cylinder 1 of FIG. 1 comprises a metallic hollow cylinder 32, the cylindrical surface of which is coated with a rubber magnet layer 33. As well known in the art, rubber magnet is a permanent magnet made of magnetized matrix composed, for example, of barium ferrite particles and powdered rubber, and is commercially available, for example, from Sumitomo 3M K.K., Tokyo, under the tradename of MAGBACK B-1044. The rubber magnet is available as a form of plate having a thickness of about one millimeter and may be adhered on the cylinder surface with a suitable adhesive agent.

The side wall of the scanning cylinder 32 (or 1 in FIG. 1) has a plurality of rectangular windows 35 (or 2 in FIG.1) the size of which is designed on account of the size of transparencies to be scanned, one of which is denoted by 38 as an example. The transparency 38 is held on the window 35 by a rectangular trimming frame 34 which is made of magnetic material, such as a steel sheet, which can be attracted by the rubber magnet layer 33. The trimming frame 34 has a window which is substantially similar in size to the window 35, and is sufficiently thin for enabling easy deflection along the cylindrical surface. On the trimming frame 34, there are provided two trimming strips 37 for arbitrarily confining the effective scanning area of the transparency 38. The thickness of the trimming strips 37 may be similar to that of the trimming frame 34 and may be about 0.1 millimeter, for example. The trimming strips 37 are made of magnetic material which is similar to that of the trimming frame 34 and constitute a trimming mask therewith.

In operation, the scanning cylinder 32 is rotated by the motor 21 at relatively high speed in the direction of arrow 39 and, at the same time, translated by the step motor 12 at relatively low speed in the direction of arrow 40, so that the transparency 38 is successively scanned by the light beam and a video signal corresponding to the trimmed area of the transparency 38 is produced at the output of the processing circuitry 31. As the scanning operation of this system has no direct connection to this invention, it will not be described further.

As readily seen from the above description, the photographic transparency 38 can be easily placed on and removed from the scanning cylinder 32 and also arbitrarily trimmed using the structure of this invention and, moreover, the resultant video signal is never affected by the contamination of the scanning cylinder surface.

Although a single embodiment of the invention has been described, it should be noted that various modifications and changes can be made by those skilled in the art within the scope of this invention as defined by the appended claims. For example, the rubber magnet layer 33 need not always cover the whole cylindrical surface of the cylinder 32, and it may be provided on a part of the cylinder surface which surrounds each window 35. Inversely, the scanning cylinder 1 or 32 may be made of magnetic material with the trimming mask members 34 and 37 made of a rubber magnet sheet. In this case, the trimming mask members may be made of non-magnetic material and provided with permanent magnet pieces at local positions thereof, instead. The trimming frame 34 need not always have a closed square shape but may be U-shaped or L-shaped. Furthermore, the trimming mask may be composed of only straight trimming strips 37 without use of such trimming frame.

In addition, the surface to which the transparency 38 is to be attached may be flat or planar instead of cylindrical as heretofore described. The principle of this invention can be similarly applied to such different scanning surface.

What is claimed is:

1. A photographic transparency supporting device comprising a supporting base member having at least one window therein and at least one holding member for holding a photographic transparency between both members and in overlying relationship to said window, a magnetic rubber layer covering at least that portion of said base member surrounding said window and said holding member is formed of a material attracted by said magnetic rubber layer.

2. A photographic transparency supporting device according to claim 1 wherein said holding member is in the form of a frame surrounding and partially overlying said transparency.

3. A photographic transparency supporting device according to claim 1 wherein said holding member is in the form of a trimming mask.

* * * * *